United States Patent [19]

Hansen et al.

[11] Patent Number: 5,255,267
[45] Date of Patent: Oct. 19, 1993

[54] APPARATUS FOR COMBINING BROADBAND AND BASEBAND SIGNAL TRANSMISSIONS

[75] Inventors: David E. Hansen, Sunnyvale; Robert P. McNamara, San Jose; Chinh Q. Phan, Fremont; Michael J. Serrone, Sunnyvale, all of Calif.

[73] Assignee: First Pacific Networks, Inc., Sunnyvale, Calif.

[21] Appl. No.: 848,570

[22] Filed: Mar. 9, 1992

[51] Int. Cl.[5] .......................... H04J 1/08; H04J 1/10
[52] U.S. Cl. ............................ 370/85.1; 370/85.3; 370/123; 370/124
[58] Field of Search .................. 370/85.1, 85.3, 124, 370/123

[56] References Cited

U.S. PATENT DOCUMENTS 4,885,747  12/1989  Foglia .......................... 370/124 X Primary Examiner—Douglas W. Olms
Assistant Examiner—Russell W. Blum
Attorney, Agent, or Firm—Townsend and Townsend Khourie and Crew

[57] ABSTRACT

Apparatus for combining broadband RF signals and baseband signals in a baseband distribution cable includes a bridge for coupling the distribution cable to an RF broadband trunk and to a baseband repeater. The trunk is connected through bidirectional amplifier, an impedance transformer, and a signal splitter for applying the amplified and impedance transformed broadband signal to a plurality of baseband segments. The RF signal from the splitter is passed through a 35 MHz high pass filter to the baseband segment. Baseband signals from a repeater are passed through a 25 MHz low pass filter to the baseband segment. The two filters prevent interference between the baseband and broadband signals. A tap in the distribution cable for accessing the broadband and baseband signals includes first and second low pass filters and a directional coupler serially connected between two cable terminals with a high pass filter connected in parallel with a first and second low pass filters whereby broadband signals can pass around the low pass filters. A third low pass filter connects an MAU port to the first and second low pass filters whereby baseband signals can be transmitted in either direction on the distribution cable without injecting noise in the broadband signal.

8 Claims, 3 Drawing Sheets

APPARATUS FOR COMBINING BROADBAND AND BASEBAND SIGNAL TRANSMISSIONS

BACKGROUND OF THE INVENTION

This invention relates generally to locate area network RF transmission systems, more particularly the invention relates to the combining of broadband and baseband transmissions on a baseband network.

A popular form of local area network is based on the IEEE 802.3 10 base 2 standard for the thin Ethernet network which uses a 50 ohm coaxial cable as the transmission medium. Transmitted signals are digital data with a carrier frequency below 25 MHz using a Manchester encoded baseband signal. Other signals do not normally coexist with the Manchester encoded signals on the same cable.

SUMMARY OF THE INVENTION

The present invention is directed to extending the bandwidth of a thin Ethernet network, for example, to support broadband transmission (i.e. 50-350 MHz). The RF broadband signal must be DC isolated, equalized, and converted from 75 ohm broadband coaxial cable impedance to 50 ohms. Further, the RF broadband signal must be split into a plurality of segments supported by a baseband repeater and suitably filtered to prevent interference with the baseband signals in each segment and provide a high impedance to the baseband signals.

Each of the baseband segments is low pass filtered to remove high frequency signals which can interfere with the RF broadband signals. The filtered baseband and broadband signals are then combined in each segment.

In accordance with one feature of the invention, these functions are accomplished with a bandwidth bridge.

Taps are provided on each segment at user nodes to access combined baseband and broadband signals. Each tap provides low pass filtering of signals from an MAU or computer interface to prevent signals from interfering with the broadband signals. Baseband signals at each tap are transmitted equally to the repeater side and the network side of the segment, while a broadband signal at each tap is transmitted with a directional coupler towards the bridge.

The invention can be implemented in a shielded twisted pair cable distribution system as well as a coaxial cable distribution system.

The invention and objects and features thereof will be more readily apparent from the following detailed description and appended claims when taken with the drawing.

DESCRIPTION OF THE PREFERRED EMBODIMENT

Figure 1:
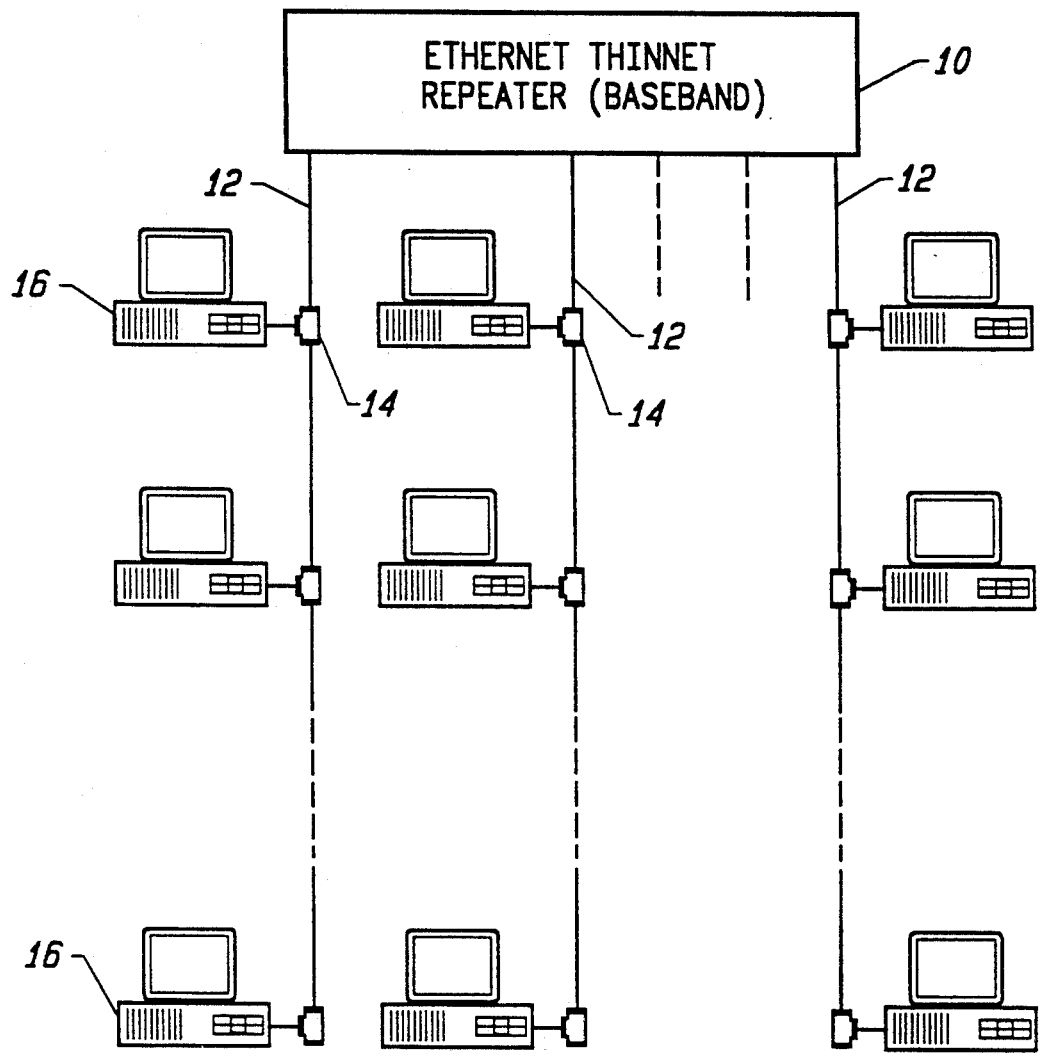
FIG. 1 is a schematic of a conventional Ethernet thin net base network.

Referring now the drawing, FIG. 1 is a schematic of a conventional thin Ethernet baseband network. Typically a repeater 10 supports multiple segments 12 with each segment comprising a 50 ohm coaxial cable. Alternatively, each segment can comprise a shielded twisted pair cable instead of a coaxial cable. A plurality of nodes (BNC"T"s) 14 are provided in each segment for interfacing a MAU or personal computer 16 to the segment.

Typically, the entire frequency spectrum of the medium is used to form the baseband signal which comprises digital data typically transmitted at 10 MBPS. Transmission is bidirectional with a signal inserted at any tap on the medium propagating in both directions to the ends. The Ethernet signal is a Manchester encoded baseband signal that does not normally allow other signals to coexist on the same cable.

Figure 2:
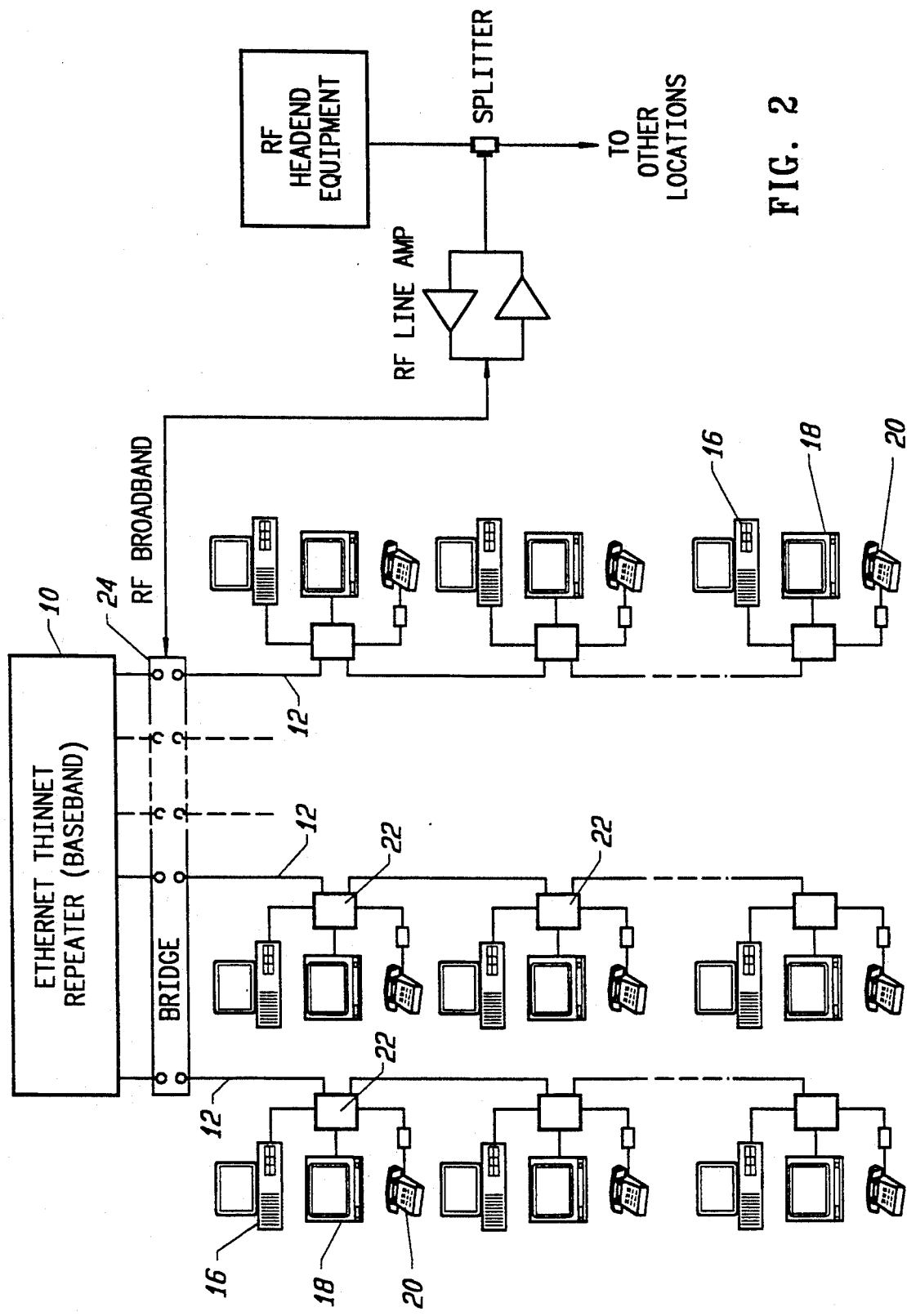
FIG. 2 is a schematic of one embodiment of a combined FR broadband and baseband network using the Ethernet network of FIG. 1.

FIG. 2 is a schematic of one embodiment of a combined RF broadband and baseband network in accordance with the invention using the Ethernet baseband network of FIG. 1. The transmission of the broadband RF transmissions (50-350 MHz) allows the network to support video devices 18 and RF telephonic devices 20 as well as personal computers 16. Special tap devices 22 are provided at each node for access to the thin Ethernet baseband and RF broadband signals transmitted in each segment. As will be described further hereinbelow, each tap provides filtering and load impedance conversion for optimal coupling of signals to and from the network cable. Higher harmonics (e.g. above 25 MHz) of the Ethernet baseband signal are filtered out at each node to prevent interference with the broadband signal, and the broadband signal is filtered to remove signals below 35 MHz so that the broadband signal does not interfere with the thin baseband signal.

A bridge 24 is connected between the Ethernet repeater 10 and the Ethernet segments 12. The bridge contains a broadband power splitter for connection to a plurality (e.g. 32) thin Ethernet segments and provides filter networks for the broadband and Ethernet signals. The broadband signal is tapped from the broadband trunk cable and is amplified by a bi-directional RF line amplifier. The amplifier provides the gain and frequency equalization needed to drive the bridge.

Figure 3:
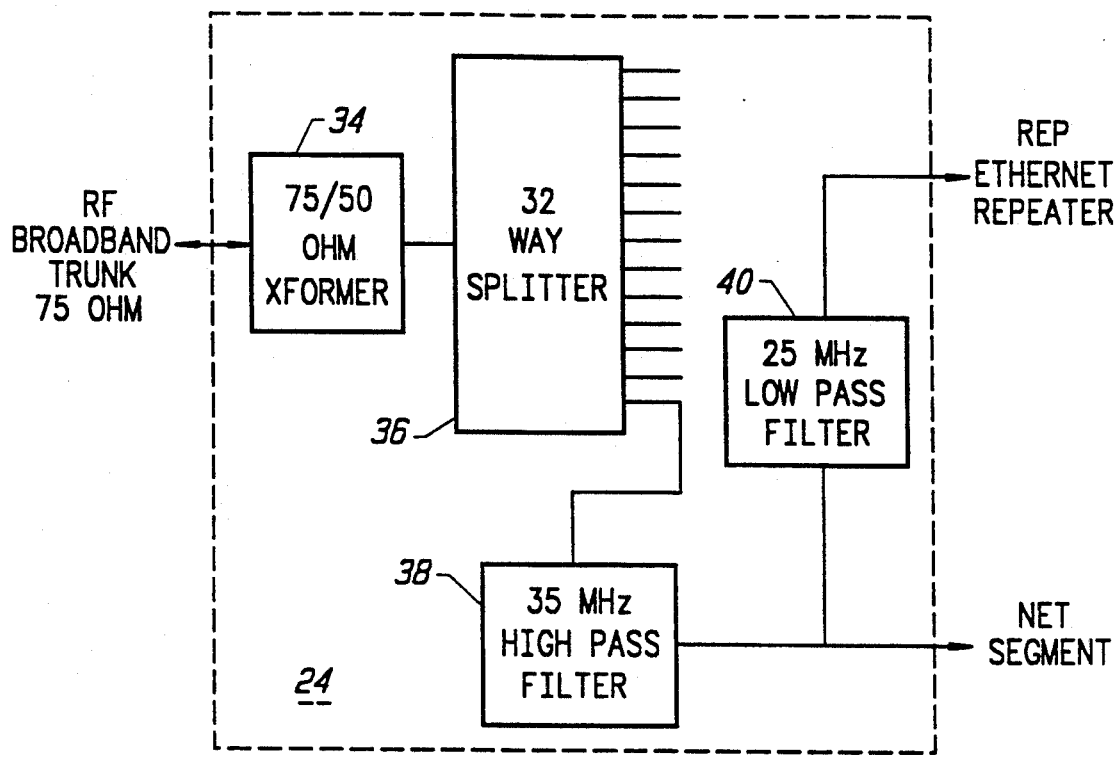
FIG. 3 is a schematic of a bridge for combining a broadband signal and a baseband signal in a baseband distribution network in accordance with one embodiment of the invention.

The bridge 24 is illustrated in more detail in the schematic of FIG. 3 in which a broadband trunk is interconnected with the Ethernet system. The broadband trunk is connected to a 75/50 ohm transformer 34 in the bridge 24. The output of transformer 34 is connected to a 32 way signal splitter 36 for coupling of the broadband signal to up to 32 segments. Each segment is connected through a 35 MHz high pass filter 38 to keep noise below 35 MHz from getting into the thin Ethernet network and provide a high impedance to the thin Ethernet signals. Each of the thin Ethernet signals from the repeater is passed through a 25 MHz low pass filter 40 to remove high frequency signals which could interfere with the RF broadband signals. The filtered thin Ethernet and RF broadband signals are then combined and connected to each segment to single or multiple users over a 100 meter max thin Ethernet segment cable.

Figure 4:
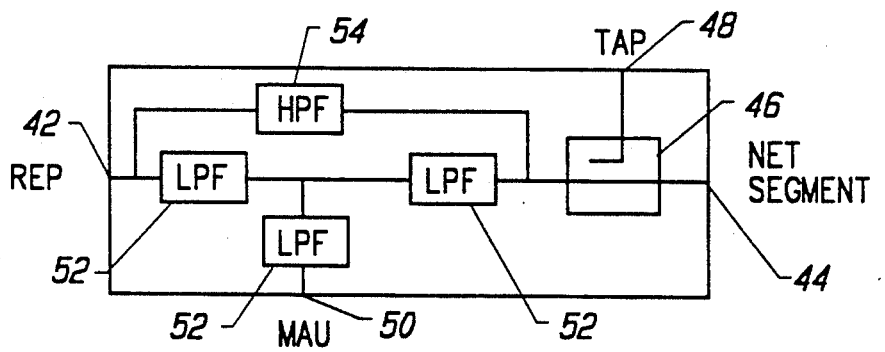
FIG. 4 is a schematic of a tap for interfacing broadband and baseband signals between users and the network.

FIG. 4 is a schematic of a tap device in accordance with the invention for providing access to the thin Ethernet baseband and broadband signals at each Ethernet node. The repeater (rep) is connected to terminal 42 of the tap, and the segment (NET) is connected to terminal 44 of the tap. The RF broadband signal is connected through a directional coupler 46 to the tap terminal 48, and a personal computer is connected to the MAU terminal 50. The MAU is connected through 25 MHz low pass filters 52 positioned between the MAU and the repeater and segment, respectively. The RF broadband signals bypass the low pass filters 52 through a 35 MHz high pass filter 54 connected between terminals 42,44. Thus signals from the MAU above 25 MHz are prevented from getting onto the network with the filters 5 providing low loss and low distortion to the network from high impedance and low impedance loads at the MAU port. The MAU presents a high impedance load when it is receiving signals and a low impedance load when it transmits signals onto the coaxial cable. The filters 52 couple the signal equally to the repeater side and the network side of the tap. Directional coupler 46 couples the broadband signal only toward the repeater side of the tap since all of the broadband signals go toward the bridge.

Thus, the tap filter is designed to low pass filter (LPF) the MAU signal before it gets onto the network cable and to pass the broadband signal (50–350 MHz) from the repeater to the network port. The MAU signal must be coupled equally to the repeater and to the network ports. The filter consists of a third order 35 MHz LPF in parallel with a third order 35 MHz HPF connected between the repeater and network ports. This filter combination passes the broadband and the baseband data signals. The MAU port is coupled to the center element of the LPF through a series resonator tuned to 54 MHz. With this configuration the MAU port is coupled to the repeater and to the network ports, with the baseband signal filtered to prevent interference with the broadband signal.

Figure 5:
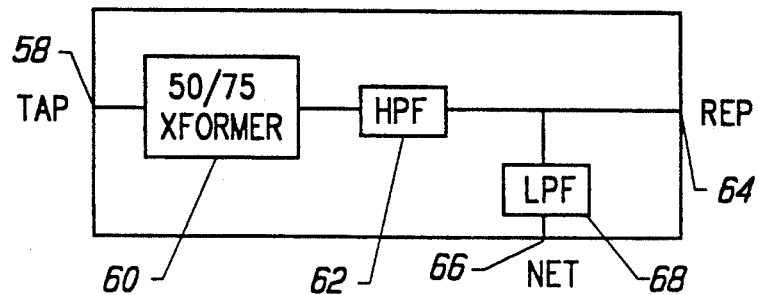
FIG. 5 is a schematic of a tap for a most remote broadband node of the network, or for a star wired system where there is only one user per network.

FIG. 5 is a schematic of another tap in accordance with the invention which is normally located at the most remote RF broadband node and separates the broadband and Ethernet signals. The broadband tap is connected through a 50/75 ohm transformer 60 and a 35 MHz high pass filter 62 to the repeater (hub) terminal 64. An MAU terminal 66 is connected through a 25 Mhz low pass filter 68 to terminal 64. Thus the tap can be used to terminate the end of a long cable for RF broadband and Ethernet signals or terminate the broadband signal and allow the Ethernet signal to continue on as a normal thin net cable. At the end of a network segment, the net terminal should be terminated with 50 ohms.

Following are system, bridge, and tap specifications for one embodiment of the invention:

| SYSTEM SPECIFICATIONS | |
|---|---|
| Parameter | Specification |
| Segments per BX Bridge | 32 |
| Length per segment | 100 meters max. |
| Nodes per segment | 1 to 5 |
| Cable type | RG-58 (thin Ethernet) |
| Nominal Impedance | 50 ohms |
| Spectrum Allocation: | |
| Baseband | 0–25 MHz |
| Broadband Upstream | 50–108 MHz |
| Broadband Downstream | 160–350 MHz |
| Signal Levels (at node) | |
| Baseband | IEEE 802.3 (10Base2) compatible |
| Broadband Upstream (into tap) | IEEE 802.7 compatible |
| Broadband Downstream | +7 dBmV per channel ±10 dB |
| Bridge Input Signal Characteristics | |
| Broadband Downstream: | |
| Input Signal Level | +40 to +60 dBmV per cH depending on cable length, may need equalization to compensate for cable frequency response tilt. |
| from broadband trunk | +57 dBmV (350 MHz) per channel |
| Nominal Impedance | 75 ohms |
| Bandwidth | 160–350 MHz |
| Broadband Upstream: | |
| Input Signal Level from network | +30 dBmV ±5 dB per channel |
| Bandwidth | 50–108 MHz |
| Baseband: | |
| No. of Segments | 32 |
| Signal Levels | IEEE 802.3 (10Base2) compatible |
| Bandwidth | IEEE B02.3 (10Base2) compatible |
| Nominal Impedance | 50 ohms |
| Bridge Performance Specifications | |
| Broadband: | |
| Input/Output VSWR | 1.2:1 (75 ohms) |
| Downstream Gain (Broadband Input to each NET output): | |
| 150–350 MHz | −22 dB ±2 dB |
| Upstream Gain (NET input to Broadband output): | |
| 50–108 MHz | −22 dB ±2 dB |
| Baseband: | |
| Input/Output VSWR | 1.2:1 (50 ohms) |
| Insertion Loss | .4 dB |
| Bandwidth, 3 dB | >25 MHz |
| Attenuation at 50 MHz | >40 dB |
| TAP Input Signal Characteristics | |
| Broadband Downstream: | |
| Output Signal Level | +10 dBmV ±10 dB per channel |
| Nominal Impedance | 75 ohms |
| Bandwidth | 160–450 MHz |
| Broadband Upstream: | |
| Input Signal Level at node | +54 dBmV +2/−6 dB per channel |
| Nominal Impedance | 75 ohms |
| Bandwidth | 50–108 MHz |
| Baseband: | |
| Signal Levels | IEEE 802.3 (10Base2) compatible |
| Bandwidth | IEEE 802.3 (10Base2) compatible |
| Nominal Impedance | 50 ohms |

There has been described a passive bridge apparatus and taps which allow the combining of RF broadband signals with baseband signals in a baseband network. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A distribution network for RF broadband signals and baseband signals comprising:
   a distribution cable;
   a repeater low pass filter for connecting said distribution cable to a baseband signal;
   a trunk high pass filter for connecting said distribution cable to a broadband signal; and
   at least one tap in said cable including first and second terminals serially connected to said cable; a first low pass filter, a second low pass filter, and a directional coupler serially connected between said first and second terminals; a first high pass filter connected in parallel with said first and second low pass filters for passing broadband signals around said low pass filters, an MAU port and low pass filter connecting said MAU port to a common terminal of said first and second low pass filters, and a broadband port connected to said directional coupler.

2. The distribution network as defined by claim 1 and further including a first impedance transformer and a signal splitter for serially connecting a broadband signal to said trunk high pass filter.

3. The distribution network defined by claim 2 wherein each low pass filter filters out signals above 25 MHz and each high pass filter filters out signals below 35 MHz.

4. The distribution network as defined by claim 1 and further including a second tap for terminating an RF broadband signal in said cable, said second tap including a third terminal, a broadband tap, and a second impedance transformer and a second high pass filter serially connected between said broadband tap and said third terminal.

5. The distribution network as defined by claim 4 wherein said second tap further includes a baseband terminal, and a fourth low pass filter connected between said third terminal and said baseband second terminal for transmitting baseband signals in said cable.

6. A tap for accessing an RF broadband signal and a baseband signal in a cable comprising:
   first and second terminals for connecting to said cable,
   a first low pass filter, a second low pass filter, and a directional coupler serially connected between said first and second terminals,
   a first high pass filter connected in parallel with said first and second low pass filters for passing broadband signals around said low pass filters,
   a third low pass filter connecting an MAU port to said first and second low pass filters, and
   a broadband port connected to said directional coupler.

7. The tap as defined by claim 6 wherein each low pass filter filters out signals about 25 MHz and said high pass filter filters out signals below 35 MHz.

8. The tap as defined by claim 6 wherein said first and second filters comprise 25 MHz low pass filters, said high pass filter comprises a 35 MHz high pass filter and said third low pass filter comprises a 54 MHz low pass filter.

* * * * *